July 26, 1960  E. C. SHAW  2,946,449
LIQUID FILTERS
Filed Aug. 15, 1957
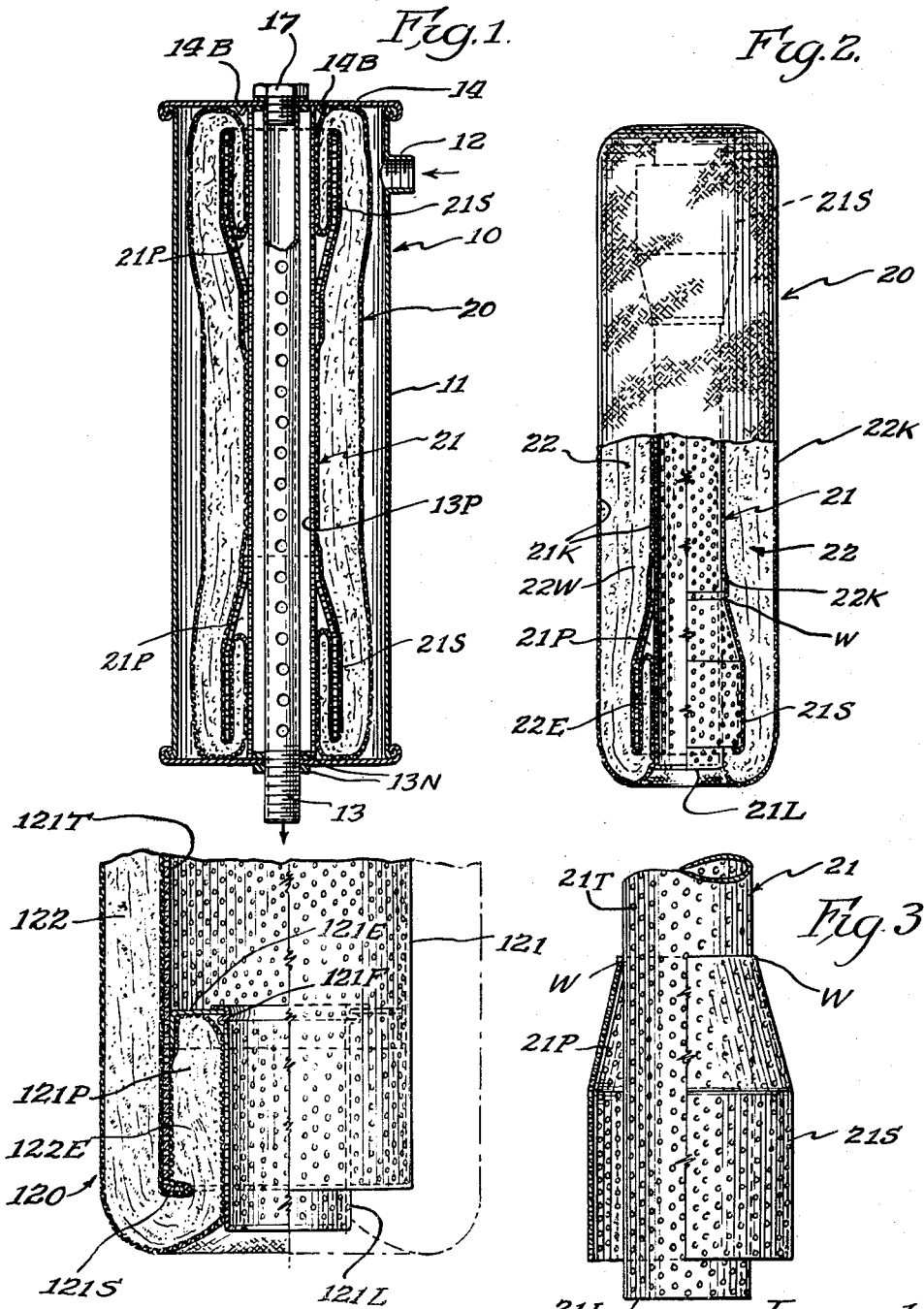
Inventor
Ernest C. Shaw.
By Mann, Brown and McWilliams.
Attys.

United States Patent Office 2,946,449
Patented July 26, 1960

2,946,449

LIQUID FILTERS

Ernest C. Shaw, 2024 Collett Lane, Flossmoor, Ill.

Filed Aug. 15, 1957, Ser. No. 678,297

15 Claims. (Cl. 210—484)

This invention relates to oil or liquid filters and particularly to such filters in which a foraminous outlet tube within a filter shell has a sleeve of filter material surrounding the tube to serve as the filtering media.

In filters of the aforesaid type the filter sleeve may be composed of fibers such as knitted material, threads, linters, paper or the like, or of combinations thereof, and the usual practice is to provide filter cartridges comprising a foraminous metal tube with the sleeve of filtering material in surrounding relation so that a cartridge may be readily replaced by clamping the new cartridge in position in the filter shell between the outlet and the removable cover of the shell.

In practice it has been found that the filter media is often bypassed due to loosening or endwise displacement of the ends of the filter sleeve, and efforts have been made to avoid this as by stiffening the fibrous filter sleeve by impregnation thereof with a stiffening material. This, however, tends to unduly restrict flow through the filter.

In view of the foregoing it is the primary object of this invention to effectually prevent bypassing of the filtering media in such filters, and related objects are to accomplish this in a simple manner, and in such a way that the filter media may be applied soft or unimpregnated so as to assure proper liquid flow.

Another object of the invention is to provide a filter cartridge that cooperates in a novel manner with the filter shell to effectually seal the ends of the fibrous filter sleeve so as to prevent bypassing of the sleeve, and a related object is to provide such a filter cartridge in which the ends of the filter sleeve are clamped and sealed against parts of the filter shell and the filter core so as to prevent endwise shortening or displacement of the filter sleeve. More specifically it is an object of this invention to accomplish such end sealing of the filter sleeve in such a way as to facilitate and simplify the production of filter cartridges.

Other and further objects of the present invention will be apparent from the following description and claims.

In the drawing:

Fig. 1 is a vertical sectional view showing the new filter cartridge in its operative relation in a filter shell;

Fig. 2 is a longitudinal sectional view of a filter cartridge embodying the invention;

Fig. 3 is a fragmental longitudinal section of the foraminous core of the cartridge; and Fig. 4 is a fragmental view similar to Fig. 2 and showing the cartridge of this invention with an alternative form of core.

For purposes of disclosure the invention is illustrated in Fig. 1 as embodied in a single cartridge filter 10 having a filter shell 11 of cylindrical form with a side inlet 12 and a bottom outlet 13, and having a removable cover 14 closing its open top, and the bottom outlet 13 is opposed to and spaced from the cover 14 so that a filter cartridge 20 may be inserted endwise through the top opening into endwise engagement with the bottom of the shell about the outlet 13 and may be clamped in position by the cover 14, thereby closing the upper end of the filter cartridge 20, while at the same time holding the same in place. The outlet 13 is formed by a perforated center pipe 13P which extends upwardly to substantially the level of the cover 14, and a clamping nut 17 may be extended through a central opening in the cover 14 and threaded into the pipe 13P to clamp the cover 14 and close the upper end of the pipe 13P.

The general filter organization thus described is conventional in character, and may take many different forms, and the present invention is concerned with a novel structure in the filter cartridge 20 and a novel cooperation thereof with the conventional filter shell and cover structures such as those above described.

Thus, as illustrated in Figs. 2 and 3, the filter cartridge 20 comprises a rigid foraminous core 21 of elongated tubular form, made in this instance from perforated sheet metal, about which a fibrous filter sleeve 22 is positioned as will be described. At its opposite ends the core 21 has a double walled structure in which inner and outer concentric walls 21L and 21S define anchoring pockets 21P of annular form opening endwise of the core 21. In the form shown in Figs. 2 and 3 the core 21 is formed in part from a perforated sheet metal tube 21T, the end portions of which provide the inner walls 21L, while the outer walls 21S are formed as separate sheet metal sleeves that are tapered inwardly at their adjacent ends and are welded as at W to the tube 21T.

The fibrous filter sleeve 22 may be of any conventional construction and material, such as a body or layer of waste 22W maintained in tubular form between inner and outer knitted fabric sleeves 22K, and under the present invention the filter sleeve 22 is made somewhat longer than usual so as to be substantially longer than the core 21, and the ends 22E of the sleeve 22 are reversely bent inwardly and are tucked endwise into the annular pockets 21P so as to be anchored therein.

In conventional filter cartridges of this general type, the ends of the foraminous core are normally engaged with lateral centering means about the outlet and on the cover of the shell, and the cartridge of the present invention also provides for a similar centering cooperation as well as for end sealing and clamping of the filter sleeve 22; thus the walls 21L are of such a diameter and are of such a length that they may cooperate with the centering means of the conventional filter shells of a particular size or design, and as shown in Fig. 1, the upper wall 21L cooperates with an annular centering bead 14B on the cover 14 while the lower wall 21L encircles the inner mounting nut 13N so as to be centered thereby.

The outer walls 21S are, however, somewhat shorter than the walls 21L and provide uniform annular end edges about which the filter sleeve 22 is bent in the anchoring operations and against which the filter sleeve 22 is clamped and sealed when the cartridge is put in position in a filter shell. The end of the outer sleeve 21S is spaced back from the end of the inner sleeve 21L in an amount somewhat less than the thickness of the filter sleeve 22. This causes the bent end portions of the sleeve 22 to project initially somewhat beyond the ends of the inner walls 22L, as shown in Fig. 2, and, hence, when the cartridge 20 is clamped in its position of use, the end portions of the filter sleeve 22 are compressed and clamped by the action of the ends of the walls 21S so as to be pressed firmly against the cover and the bottom wall. The ends of the sleeve 22 are thus flattened and a wide area thereof is effective to attain the desired end sealing action.

In Fig. 4 of the drawing an alternative form of the invention is illustrated wherein a cartridge 120 has a foraminous core 121 that is somewhat different than the core 21. Thus, a foraminous sheet metal tube 121T is employed that is larger in diameter than the tube 21T, and the end portions of the tube 121T provide the outer walls 121S of the anchoring pockets 121P. The inner walls of the pockets 121P are provided by short tubular sheet metal members, the inner ends of which are seamed at 121F onto inwardly projecting flanges 121E that are fixed as by welding or rolling within the tube 121T. The proportioning of the parts corresponds with previously described embodiments, and a filter sleeve 122 has its ends anchored in the pockets 121P in the same manner. Thus, the same advantageous end sealing is provided when the cartridge 120 is put in its position of use.

From the foregoing description, it will be apparent that the present invention enables bypassing of the filtering media to be avoided and it will also be apparent that this is accomplished in a simple manner and in such a way that the filtering media is held in place on the core during shipment and installation.

It will also be apparent that the present invention provides an improved filter cartridge wherein the mounting of the filter sleeve on the cartridge assures that the end portions of the filter sleeve will be effectually sealed when the cartridge is put in place in a filter shell.

Thus, while I have illustrated and described but two embodiments of the invention, it will be recognized that variations may be made by those skilled in the art without departing from the scope of the invention.

I claim:

1. In a filter cartridge, a rigid foraminous tubular core having concentric foraminous double walls at the ends thereof permanently connected to each other intermediate the ends of the core and defining anchoring pockets at the respective ends of the core and open in an axial direction at the respective ends of the core, and a filter sleeve surrounding the core including said double walls and having its ends extending inwardly and then reversely toward each other and inserted into the respective anchoring pockets.

2. A filter cartridge according to claim 1 wherein the inner one of the concentric walls at each end projects endwise beyond the outer one of said walls.

3. A filter cartridge according to claim 1 in which the outer one of said end walls provides an even annular clamping surface against which the overlying filter material may be pressed endwise to form a pressure seal at the ends of the sleeve.

4. A filter cartridge according to claim 1 in which the core is formed from a tube which provides the inner one of said walls and the outer one of said walls is provided by a separate member in each instance secured to the tube.

5. A filter cartridge according to claim 1 in which the core is formed from a tube which provides the outer one of said walls and the inner one of said walls is provided by a separate member in each instance secured to the tube.

6. A filter cartridge according to claim 1 in which the core is formed from a tube which provides one of said walls at each end and in which the other walls at the respective ends are formed as separate members of a different diameter and secured to the tube.

7. In a filter having a filter shell with a side inlet, an end outlet and a cover disposed in opposed relation to the outlet, the improvement which comprises a filter cartridge in said shell having a rigid foraminous tubular core having concentric foraminous inner and outer walls adjacent the ends thereof secured together at points spaced from the ends of the core and defining oppositely facing annular anchoring pockets at the respective ends of the core, and a filter sleeve surrounding the core and the foraminous outer walls and having its ends reversely bent and inserted into the respective anchoring pockets, and with the reversely bent ends of said sleeve clamped and sealed against said outer walls.

8. A core for a filter cartridge comprising a rigid foraminous tubular core having concentric foraminous double walls at the ends and permanently secured together at points spaced from the ends thereof and said double walls defining oppositely facing annular anchoring pockets at the respective ends of the core.

9. A core for a filter cartridge according to claim 8 wherein the inner one of the concentric walls at each end projects endwise beyond the outer one of said walls.

10. A core for a filter cartridge according to claim 8 in which the outer one of said end walls provides an even annular clamping surface against which the overlying filter material may be pressed endwise to form a pressure seal at the ends of the sleeve.

11. A core for a filter cartridge according to claim 8 in which the core is formed from a tube which provides the inner one of said walls and the outer one of said walls is provided by a separate member in each instance secured to the tube.

12. A core for a filter cartridge according to claim 8 in which the core is formed from a tube which provides the outer one of said walls and the inner one of said walls is provided by a separate member in each instance secured to the tube.

13. A core for a filter cartridge according to claim 8 in which the core is formed from a tube which provides one of said walls at each end and in which the other walls at the respective ends are formed as separate members of a different diameter and secured to the tube.

14. In a filter cartridge, a rigid foraminous core, annular means about and spaced radially outwardly from said core at the ends thereof and secured to the core at points spaced from the ends thereof, and a filter sleeve surrounding said core and said annular means and having its ends reversely bent about said annular means and tucked into the space between said annular means and said core with said reverse bends of the filter sleeve projecting beyond the ends of the core.

15. In a core for a filter cartridge, a rigid tubular foraminous member, and annular means about and spaced radially outwardly from said core at the ends thereof to provide space in which the ends of a filter sleeve may be anchored, said annular means being permanently secured to the foraminous member at points spaced from the ends of said member.

References Cited in the file of this patent

UNITED STATES PATENTS

| | | |
|---|---|---|
| 817,253 | Kneuper | Apr. 10, 1906 |
| 1,892,210 | Gordon | Dec. 27, 1932 |
| 2,168,124 | Hurn | Aug. 1, 1939 |
| 2,334,664 | Wicks | Nov. 16, 1943 |
| 2,714,964 | Radford | Aug. 9, 1955 |
| 2,751,618 | Pruitt | June 26, 1956 |